(12) United States Patent
Saito et al.

(10) Patent No.: US 10,913,347 B2
(45) Date of Patent: Feb. 9, 2021

(54) UPPER STRUCTURE OF ENGINE

(71) Applicant: Mazda Motor Corporation, Hiroshima (JP)

(72) Inventors: Ken Saito, Aki-gun (JP); Takashi Kashiwabara, Aki-gun (JP); Masayuki Furutani, Higashihiroshima (JP); Ryosuke Kawafune, Hiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 0 days.

(21) Appl. No.: 16/490,865

(22) PCT Filed: Feb. 15, 2018

(86) PCT No.: PCT/JP2018/005147
§ 371 (c)(1),
(2) Date: Sep. 3, 2019

(87) PCT Pub. No.: WO2018/173556
PCT Pub. Date: Sep. 27, 2018

(65) Prior Publication Data
US 2020/0031217 A1 Jan. 30, 2020

(30) Foreign Application Priority Data
Mar. 24, 2017 (JP) ................. 2017-059474

(51) Int. Cl.
*B60K 11/06* (2006.01)
*F01P 11/10* (2006.01)
(Continued)

(52) U.S. Cl.
CPC .............. *B60K 11/06* (2013.01); *B60K 11/04* (2013.01); *B62D 25/081* (2013.01)

(58) Field of Classification Search
CPC ........ B60K 13/04; B60K 11/06; B60K 11/08; F01P 5/06; F01P 11/10; F01P 1/06
See application file for complete search history.

(56) References Cited

U.S. PATENT DOCUMENTS 5,216,996 A * 6/1993 Kato ...................... F02M 69/08
123/533
7,011,071 B1 * 3/2006 Decuir, Jr. .............. F02B 33/26
123/317
(Continued)

FOREIGN PATENT DOCUMENTS

| JP | H0305023 U | 5/1991 |
| JP | 2009167947 A | 7/2009 |

(Continued)

*Primary Examiner* — Long T Tran
(74) *Attorney, Agent, or Firm* — Alleman Hall Creasman & Tuttle LLP

(57) ABSTRACT

An engine is a rear exhaust engine provided with an exhaust system component on a rear side in a vehicle front-rear direction. This engine includes a first flow rectifying member, provided above the engine, that subjects traveling wind to flow rectification so that the traveling wind flows rearward and a second flow rectifying member, disposed adjacently to a rear side of the first flow rectifying member, that subjects the traveling wind, subjected to flow rectification by the first flow rectifying member, to flow rectification so that the traveling wind is directed to the exhaust system component, in which fuel system components are disposed below the first flow rectifying member.

13 Claims, 10 Drawing Sheets

(51) Int. Cl.
 *B60K 11/04* (2006.01)
 *B62D 25/08* (2006.01)

(56) References Cited

U.S. PATENT DOCUMENTS

| | | | | |
|---|---|---|---|---|
| 2006/0048742 | A1* | 3/2006 | Sagara | F02B 61/06 |
| | | | | 123/198 E |
| 2008/0006329 | A1* | 1/2008 | Yamakura | F01P 11/10 |
| | | | | 137/354 |
| 2014/0370768 | A1* | 12/2014 | Shomura | F02M 35/10013 |
| | | | | 440/88 A |
| 2017/0114705 | A1* | 4/2017 | Suzuki | F01P 11/029 |
| 2018/0065473 | A1* | 3/2018 | Saito | F02B 77/11 |
| 2018/0086198 | A1* | 3/2018 | Maeda | B60K 11/04 |

FOREIGN PATENT DOCUMENTS

| | | |
|---|---|---|
| JP | 20131119384 A | 6/2013 |
| JP | 2016130074 A | 7/2016 |
| JP | 2017013638 A | 1/2017 |

\* cited by examiner

UPPER STRUCTURE OF ENGINE

TECHNICAL FIELD

The present invention relates to an upper structure of an engine.

BACKGROUND ART

PTL 1 discloses an encapsulating member that has a structure in which an upper surface cover for shielding the upper surface of an engine bay is integrated with left and right side covers for shielding side surfaces and surrounds the upper side of a powertrain including an engine and a transmission. An insulator is provided on the inner surface of the encapsulating member. In addition, PTL 1 discloses the disposition of a guide for introducing traveling wind to exhaust system components on the inner side surfaces of side surface covers.

CITATION LIST

Patent Literature

PTL 1: JP-A-2013-119384

SUMMARY OF INVENTION

Technical Problem

Fuel system components such as an ignition coil, a common rail for fuel supply, and a fuel pipe connecting the common rail and a fuel injection valve are disposed on the upper surface of the engine. Therefore, even if an attempt is made to introduce traveling wind to the space between the upper surface cover of the encapsulating member and the engine to cool the exhaust system components behind the engine, a flow of the traveling wind is disturbed because the traveling wind hits the fuel system components and the like. Accordingly, the exhaust system components cannot be cooled efficiently.

Although the introduction amount of traveling wind can be increased by enlarging the gap between the encapsulating member and the engine, this degrades the heat retaining performance for the engine by the encapsulation member.

Therefore, the inventor has considered covering fuel system components with a flow rectifying member for traveling wind. That is, this measure causes traveling wind to flow along the upper surface of the flow rectifying member. This can introduce traveling wind to exhaust system components without being disturbed by the fuel system components and the like.

However, when the engine is pushed rearward by an obstacle during a frontal collision (front side collision) of the vehicle, the flow rectifying member may be moved rearward together with the engine and collide with vehicle body structural members such as a cowl member, possibly destroying the flow rectifying member and thereby destroying the fuel system components.

That is, an object of the present invention is to achieve the cooling of exhaust system components with traveling wind and the protection of the fuel system components during a frontal collision at the same time.

Solution to Problem

To solve the above problems, the present invention protects fuel system components from a collision with vehicle body structural members during a frontal collision of a vehicle by adding a device to a flow rectifying member for introducing traveling wind to exhaust system components.

An upper structure of an engine to be disclosed here assumes a rear exhaust engine provided with an exhaust system component behind the engine in a vehicle front-rear direction, the upper structure including a first flow rectifying member provided above the engine, the first flow rectifying member subjecting traveling wind to flow rectification so that the traveling wind flows rearward along an upper surface thereof; and a second flow rectifying member provided behind the first flow rectifying member, the second flow rectifying member subjecting the traveling wind, subjected to flow rectification by the first flow regulation member, to flow rectification so that the traveling wind is directed to the exhaust system component along an upper surface thereof, in which a fuel system component of the engine is disposed below the first flow rectifying member.

According to this, since the traveling wind flows rearward along the upper surface of the first flow rectifying member, the traveling wind can be efficiently introduced rearward without being disturbed by the fuel system component. In addition, since the traveling wind subjected to flow rectification by the first flow rectifying member is subjected to flow rectification by the second flow rectifying member so as to be directed to the exhaust system component, the exhaust system component can be efficiently cooled. Therefore, a wide space through which the traveling wind is introduced to the exhaust system component does not need to be provided above the engine and unnecessary cooling of the engine can be avoided.

When the engine is moved rearward due to a front collision of the vehicle, the second flow rectifying member on the rear side in the vehicle front-rear direction collides with a vehicle body structure member such as a cowl member prior to the first flow rectifying member. Therefore, an impact load is received by the second flow rectifying member. In other words, the impact is absorbed by the second flow rectifying member. Accordingly, the first flow rectifying member is prevented from being destroyed together with the second flow rectifying member or the fuel system component provided below the first flow rectifying member is prevented from directly receiving a large impact load. Accordingly, destruction of the fuel system component due to deformation of the first flow rectifying member or destruction of the fuel system component due to the impact load described above is advantageously prevented.

In a preferable embodiment, a cowl member extending forward from an upper portion of a dash panel is provided behind the second flow rectifying member, the second flow rectifying member has an inclined plane inclined downward toward a rear side to direct the traveling wind to the exhaust system component, and the cowl member faces the inclined plane of the second flow rectifying member in the vehicle front-rear direction.

According to this, when the engine is moved rearward due to a front collision of the vehicle and the cowl member makes contact with the inclined plane of the second flow rectifying member, the cowl member slides on the inclined plane and is deformed upward. That is, the force applied from the cowl member to the second flow rectifying member is released upward along the inclined plane. Therefore, the impact received by the second flow rectifying member becomes smaller. Accordingly, the first flow rectifying member and the fuel system component are advantageously protected by the second flow rectifying member.

In a preferable embodiment, an oil separator having a cavity therein is provided below the second flow rectifying member.

Therefore, since the impact is partially absorbed by deformation of the oil separator when the second flow rectifying member is deformed due to the collision with the vehicle body structural member, the first flow rectifying member and the fuel system component are advantageously protected.

In a preferable embodiment, a cover member that covers the second flow rectifying member is provided between the second flow rectifying member and a hood so that a gap through which the traveling wind passes is present.

Accordingly, the cover member can be used to improve the heat retaining effect for the engine and to regulate a flow of the traveling wind so that the traveling wind is introduced to the exhaust system component. Therefore, the exhaust system component can be efficiently cooled.

In a preferable embodiment, an opening is provided between the engine and a front end of the first flow rectifying member so that the traveling wind flows in a space between the engine and the first flow rectifying member.

Therefore, since the fuel system component provided below the first flow rectifying member can be cooled by the traveling wind, an abnormal rise in temperature is advantageously prevented.

In addition, an upper structure of an engine to be disclosed here assumes a rear exhaust engine provided with an exhaust system component behind the engine in a vehicle front-rear direction, the upper structure including a flow rectifying member provided above the engine, the flow rectifying member subjecting traveling wind to flow rectification so that the traveling wind is directed to the exhaust system component along an upper surface thereof, in which the flow rectifying member includes a first flow rectifying part and a second flow rectifying part provided behind the first flow rectifying part, a fuel system component of the engine is disposed below the first flow rectifying part, and the second flow rectifying part has a rigidity higher than that of the first flow rectifying part.

According to this, since the traveling wind flows rearward along the upper surface of the flow rectifying member, the traveling wind can be efficiently introduced rearward without being disturbed by the fuel system component. In addition, since the traveling wind is subjected to flow rectification so as to be directed to the exhaust system component, the exhaust system component can be efficiently cooled. Therefore, a wide space through which the traveling wind is introduced to the exhaust system component does not need to be provided above the engine and unnecessary cooling of the engine can be avoided.

When the engine is moved rearward due to a frontal collision of the vehicle and the flow rectifying member collides with a vehicle body structure member such as a cowl member, an impact load is received by the second flow rectifying member having a high rigidity. Accordingly, the first flow rectifying part and the fuel system component provided below the first flow rectifying part are prevented from directly receiving a large impact load. Accordingly, destruction of the fuel system component due to deformation of the first flow rectifying member or destruction of the fuel system component due to the impact load described above is advantageously prevented. In addition, since only the second flow rectifying part in the flow rectifying member has a high rigidity, an increase in the vehicle weight can also be suppressed.

In a preferable embodiment, a cowl member extending forward from an upper portion of a dash panel is provided behind the second flow rectifying part, the second flow rectifying part has an inclined plane inclined downward toward a rear side to direct the traveling wind to the exhaust system component, and the cowl member faces the inclined plane of the second flow rectifying part in the vehicle front-rear direction.

According to this, when the engine is moved rearward due to a front collision of the vehicle and the cowl member makes contact with the inclined plane of the second flow rectifying part, the cowl member slides on the inclined plane and is deformed upward. That is, the force applied from the cowl member to the second flow rectifying part is released upward along the inclined plane. Therefore, the impact received by the second flow rectifying part becomes smaller. Accordingly, the first flow rectifying part and the fuel system component are advantageously protected by the second flow rectifying part.

In a preferable embodiment, an oil separator having a cavity therein is provided below the second flow rectifying part.

Therefore, since the impact is partially absorbed by deformation of the oil separator when the second flow rectifying part is deformed due to the collision with the vehicle body structural member, the first flow rectifying part and the fuel system component are advantageously protected.

In a preferable embodiment, a cover member that covers the second flow rectifying part is provided between the second flow rectifying part and a hood so that a gap through which the traveling wind passes is present.

Accordingly, the cover member can be used to improve the heat retaining effect for the engine and to regulate a flow of the traveling wind so that the traveling wind is introduced to the exhaust system component. Therefore, the exhaust system component can be efficiently cooled.

In a preferable embodiment, an opening is provided between the engine and a front end of the flow rectifying member so that the traveling wind flows in a space between the engine and the flow rectifying member.

Therefore, since the fuel system component provided below the first flow rectifying part can be cooled by the traveling wind, an abnormal rise in temperature is advantageously prevented.

Advantageous Effects of Invention

According to the present invention, since traveling wind can be efficiently introduced rearward without being disturbed by the fuel system component so as to be directed to the exhaust system component, the exhaust system component can be efficiently cooled without unnecessarily cooling the engine. In addition, when the engine is moved rearward due to a frontal collision of the vehicle, since the second flow rectifying member or the second flow rectifying part receives an impact load due to a collision with a vehicle body structural member such as a cowl member, the fuel system component is advantageously protected.

DESCRIPTION OF EMBODIMENTS

Embodiments for achieving the present invention will be described below with reference to the drawings. Description of the preferable embodiments below is only an example and does not intend to limit the present invention, an object to which the present invention has been applied, and the use of the present invention.

Figure 1:
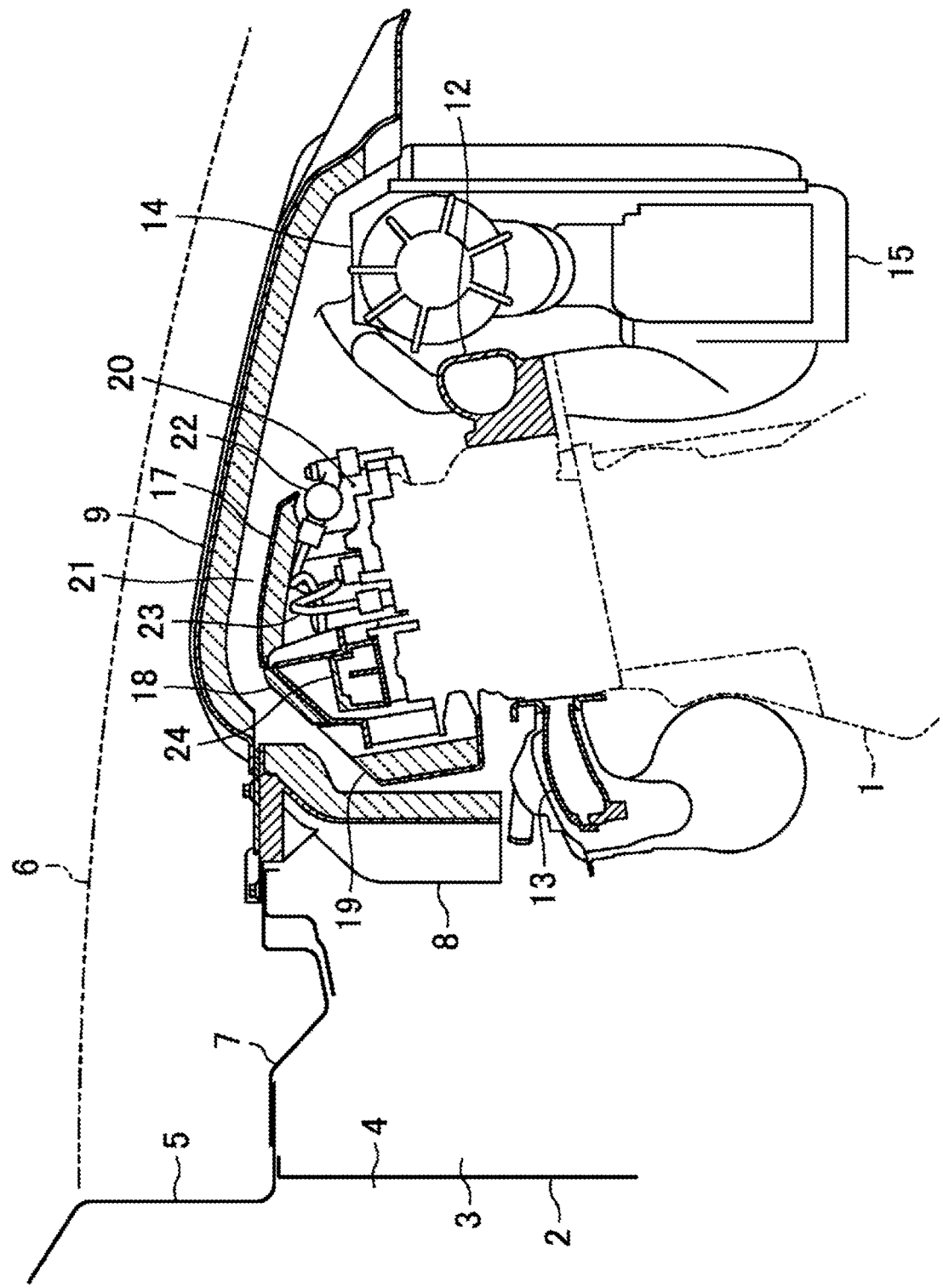
FIG. 1 is a vertical sectional view illustrating an upper structure of an engine in which a part thereof is omitted.

In an upper structure of an engine of a vehicle illustrated in FIG. 1, reference character 1 represents an engine, reference character 2 represents a dash panel that partitions an engine bay 3 from a vehicle interior 4 behind the engine bay 3, reference character 5 represents a cowl panel provided above the dash panel 2, and reference character 6 represents a hood that covers the engine bay 3. As illustrated also in FIG. 2, a cowl front panel 7 extending forward from the upper portion of the dash panel 2 is joined to the lower end portion of the cowl panel 5. As illustrated also in FIG. 3, a back heat retaining cover 8 that covers the upper portion of the engine 1 from the rear side is fixed to the front end portion of the cowl front panel 7. In addition, the rear end portion of an upper heat retaining cover 9 that covers the engine 1 from above is supported by and fixed to the upper end portion of the back heat retaining cover 8.

Figure 2:
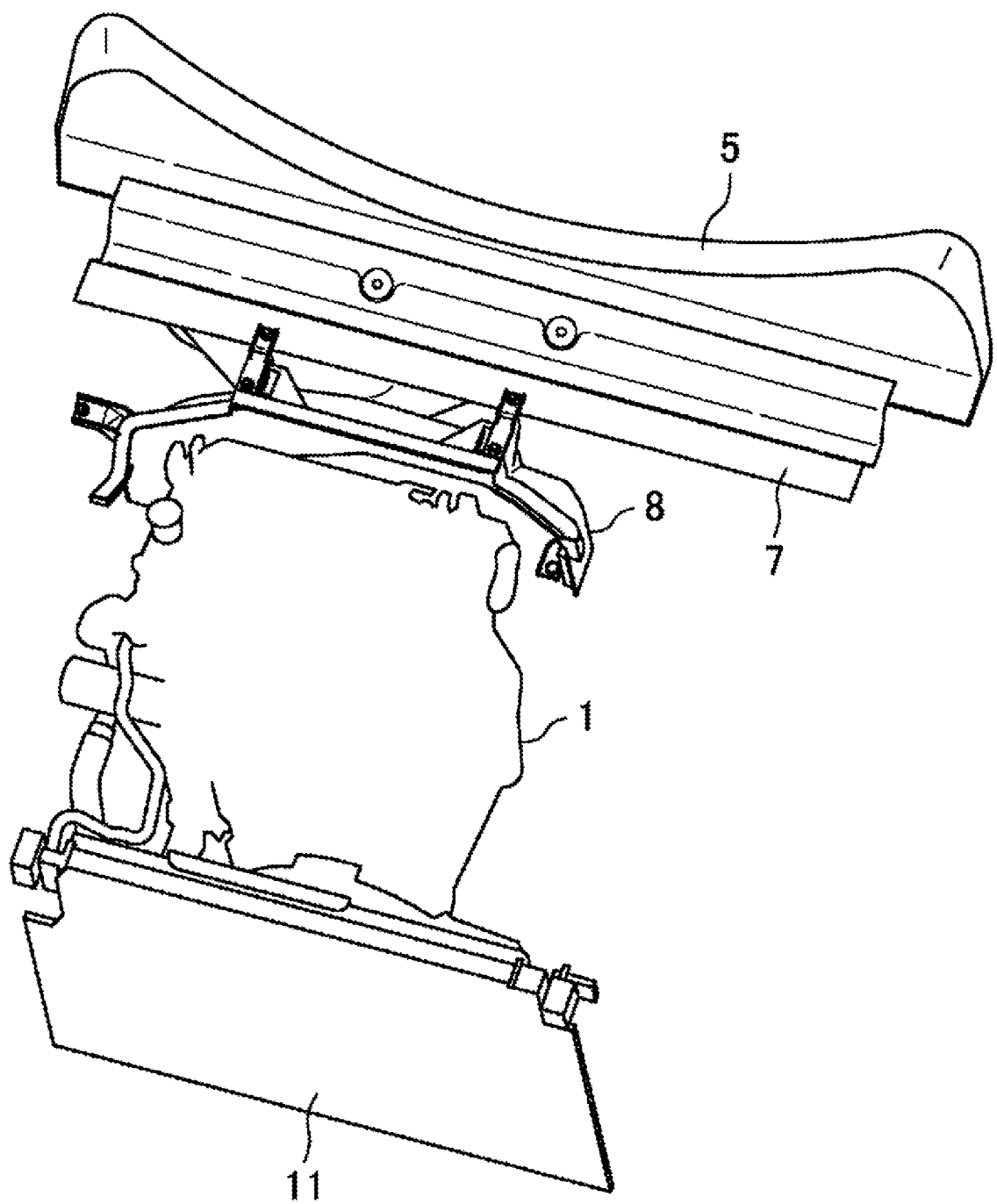
FIG. 2 is a perspective view illustrating this structure in which an upper heat retaining cover, a flow rectifying member, and the like are omitted.
Figure 3:
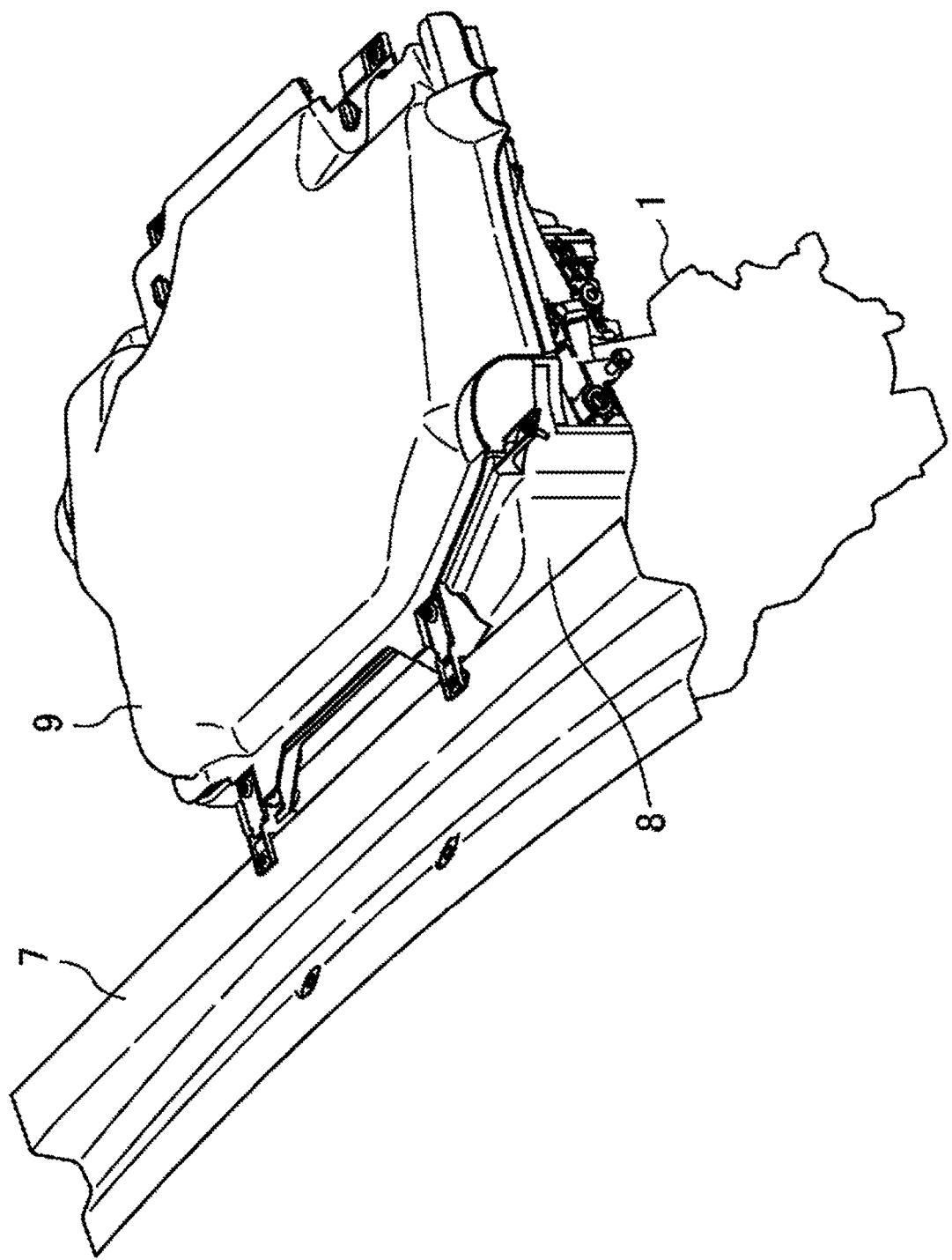
FIG. 3 is a perspective view illustrating this structure to which a heat retaining cover has been added.

The heat retaining covers 8 and 9 are formed by adhering insulators made of foamed resin onto the inner surfaces of plates made of synthetic resin. In FIG. 2, reference character 11 represents a radiator.

As illustrated in FIG. 1, the engine 1 is a rear exhaust engine in which an intake manifold 12 as the intake system component is disposed on the front side in a vehicle front-rear direction and an exhaust manifold 13 as the exhaust system component is disposed on the rear side. In FIG. 1, reference character 14 represents a turbocharger and reference character 15 represents an intercooler. Between the engine 1 and the heat retaining covers 8 and 9, three flow rectifying members 17 to 19 are disposed adjacently to each other in the vehicle front-rear direction so as to introduce traveling wind to the exhaust manifold 13. That is, the three flow rectifying members are the first flow rectifying member 17 provided above the upper surface front portion of the engine 1, the second flow rectifying member 18 provided behind (above the upper surface rear portion of the engine 1) of the first flow rectifying member 17, and the third flow rectifying member 19 provided behind the upper portion of the engine 1.

Figure 4:
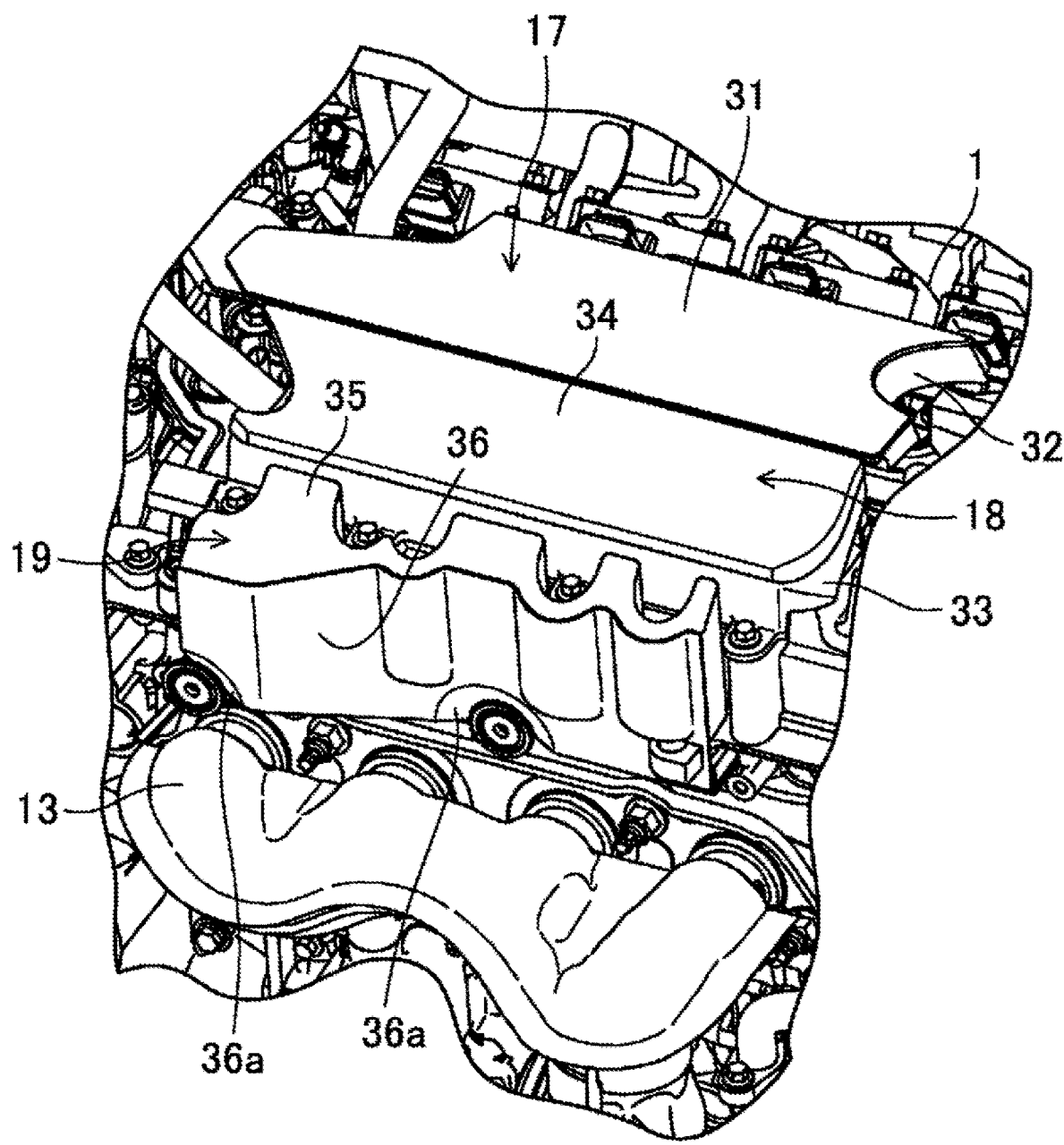
FIG. 4 is a perspective view illustrating this structure from which the heat retaining cover has been removed.

As illustrated also in FIG. 4, the flow rectifying members 17 to 19 are arranged in the vehicle front-rear direction and the three flow rectifying members 17 to 19 form, between the three flow rectifying members 17 to 19 and the heat insulating covers 8 and 9, a traveling wind passage 21 (see FIG. 1) that introduces traveling wind to the exhaust manifold 13.

Figure 5:
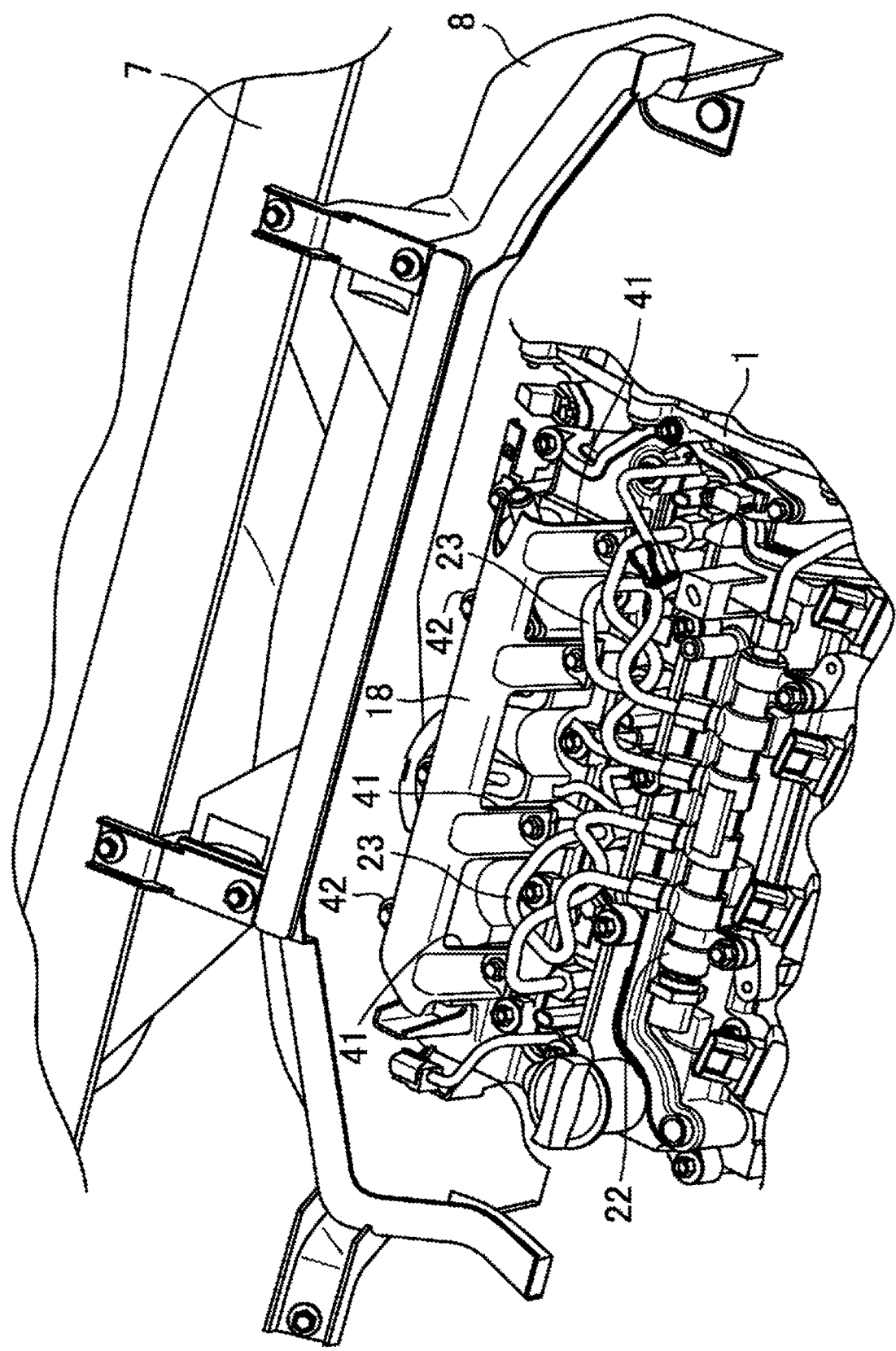
FIG. 5 is a perspective view illustrating this structure from which a first flow rectifying member has been removed.

FIG. 5 is a plan view illustrating the engine 1 with the first flow rectifying member 17 removed. Fuel system components of the engine 1 are disposed below the first flow rectifying member 17. In this diagram, reference character 22 represents a common rail (fuel rail) for fuel supply that extends in a cylinder bank direction of the engine 1 and fuel supply pipes 23 that branch from the common rail 22 are connected to fuel injection valves of individual cylinders.

Figure 6:
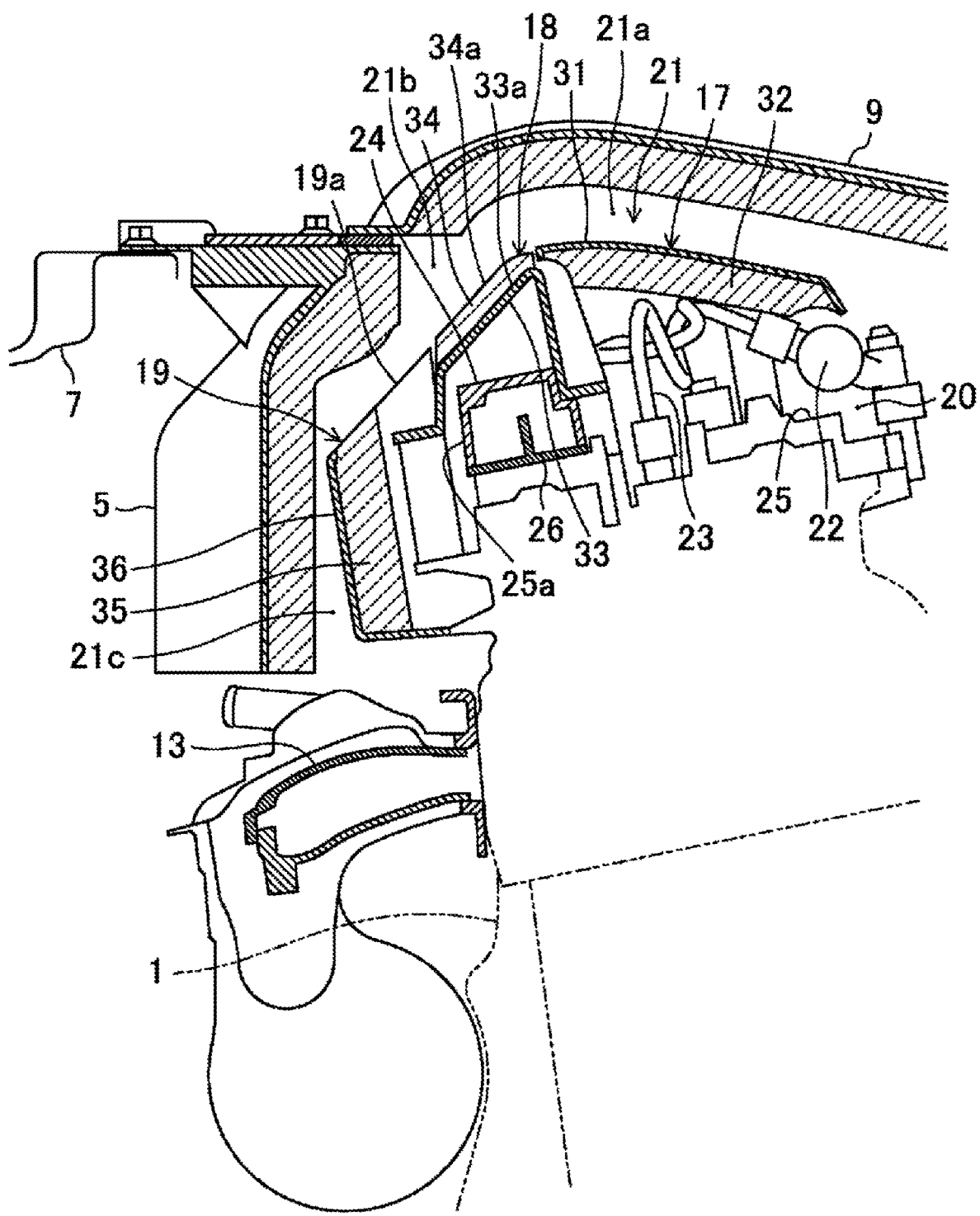
FIG. 6 is an enlarged vertical sectional view illustrating a part in FIG. 1.

As illustrated in FIG. 6 that is a partial enlarged view of FIG. 1, an oil separator 24 having a cavity therein is provided below the second flow rectifying member 18. The oil separator 24 is formed by attaching a baffle plate 26 to the lower surface of a projecting part 25a that projects upward from a cylinder head cover 25.

The first flow rectifying member 17 is formed by adhering an insulator 32 made of foamed resin onto the lower surface of a plate 31 made of synthetic resin. The second flow rectifying member 18 is formed by adhering an insulator 34 made of foamed resin onto the upper surface of a plate 33 made of light metal (for example, aluminum alloy). The third flow rectifying member 19 is formed by covering the rear surface of an insulator 35 made of foamed resin with a plate 36 made of light metal (for example, aluminum alloy).

The upper surface of the first flow rectifying member 17 is substantially horizontal and smooth to subject traveling wind to flow rectifying so that the traveling wind flows rearward along the upper surface. In addition, an opening 20 is formed between the front end of the first flow rectifying member 17 and the engine 1 so that the traveling wind flows in the space between the first flow rectifying member 17 and the engine 1.

The upper surface of the second flow rectifying member 18 is a smooth inclined plane inclined downward toward the rear side to direct the traveling wind subjected to flow rectification by the first flow rectifying member 17 to the exhaust manifold 13 as the exhaust system component along the upper surface. That is, the upper surface of the plate 33 of the second flow rectifying member 18 is an inclined plane 33a inclined downward toward the vehicle rear side and the upper surface of the insulator 34 pasted to the plate 33 is also an inclined plane 34a inclined downward according to the inclination of the plate 33. The inclined planes 33a and 34a of the second flow rectifying member 18 face the cowl front panel 7 in the vehicle front-rear direction.

The upper surface of the third flow rectifying member 19 is a smooth inclined plane 19a inclined downward toward the rear side so as to direct the traveling wind subjected to flow rectification by the second flow rectifying member 18 to the exhaust manifold 13 along the upper surface.

The height of the rear end of the upper surface of the first flow rectifying member 17 is substantially the same as that of the front end of the insulator 34 of the second flow rectifying member 18. The inclined planes 34a of the second flow rectifying member 18 is substantially flush with the inclined plane 19a of the third flow rectifying member 19.

In the above structure, the traveling wind passage 21 between the heat retaining covers 8 and 9 and the flow rectifying members 17 to 19 includes a first passage 21a that extends substantially horizontally in the vehicle front-rear direction, a second passage 21b that is continuous with the first passage 21a and inclined downward toward the vehicle rear side, and a third passage 21c that is continuous with the second passage 21b and extends downward toward the exhaust manifold 13.

That is, the first passage 21a is formed between the upper heat retaining cover 9 and the first flow rectifying member 17, the second passage 21b is formed between the rear portion of the upper heat retaining cover 9 and the upper portion of the rear heat retaining cover 8 and the inclined planes of the second flow rectifying member 18 and the third flow rectifying member 19, and the third passage 21c is formed between the lower portion of the rear heat retaining cover 8 and the rear surface of the third flow rectifying member 19.

Figure 7:
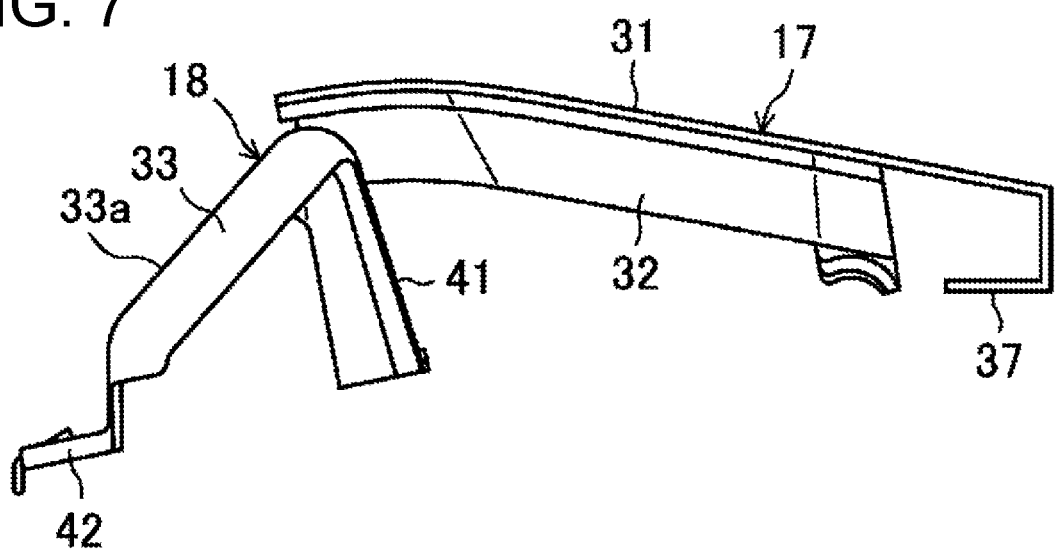
FIG. 7 is a side view illustrating a state in which the first flow rectifying member is combined with a plate of a second flow rectifying member.
Figure 8:
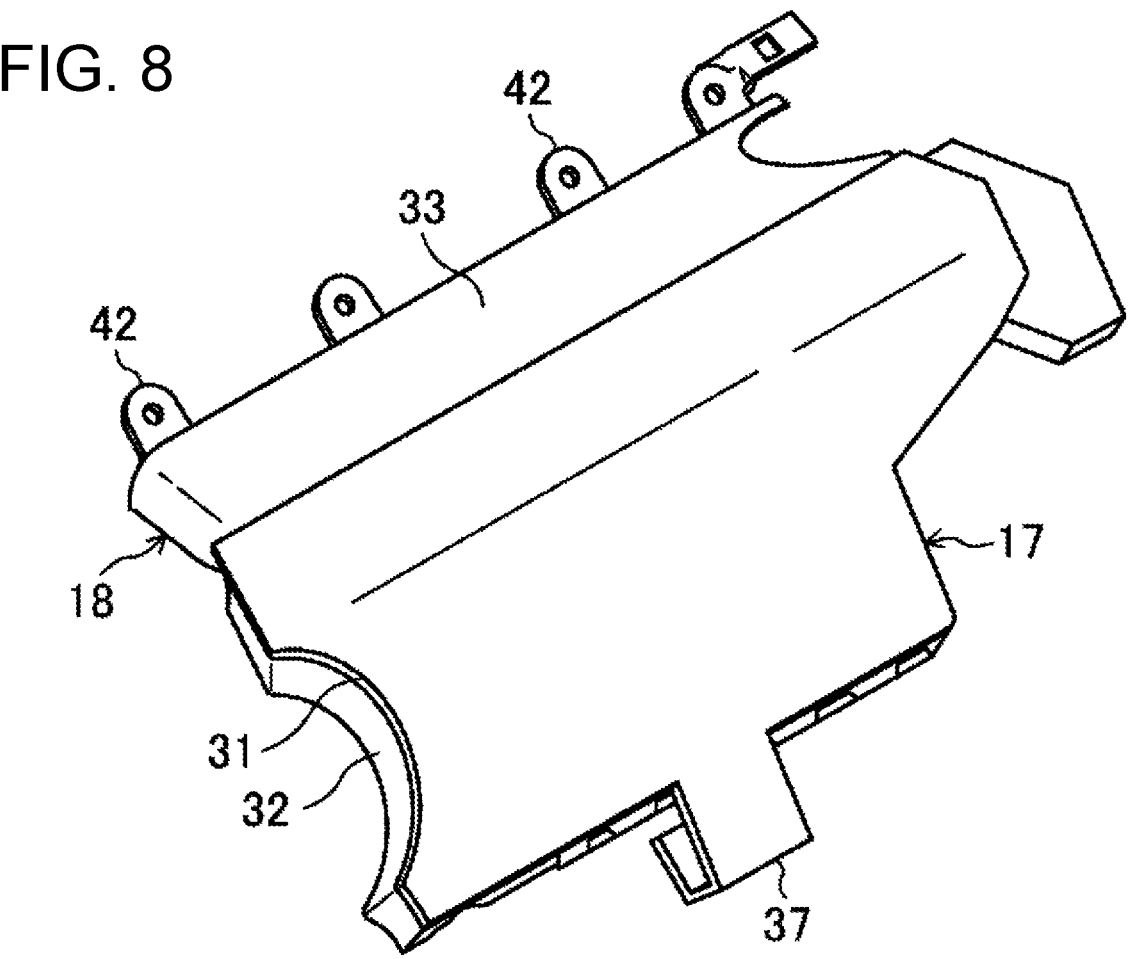
FIG. 8 is a perspective view illustrating this state from above.
Figure 9:
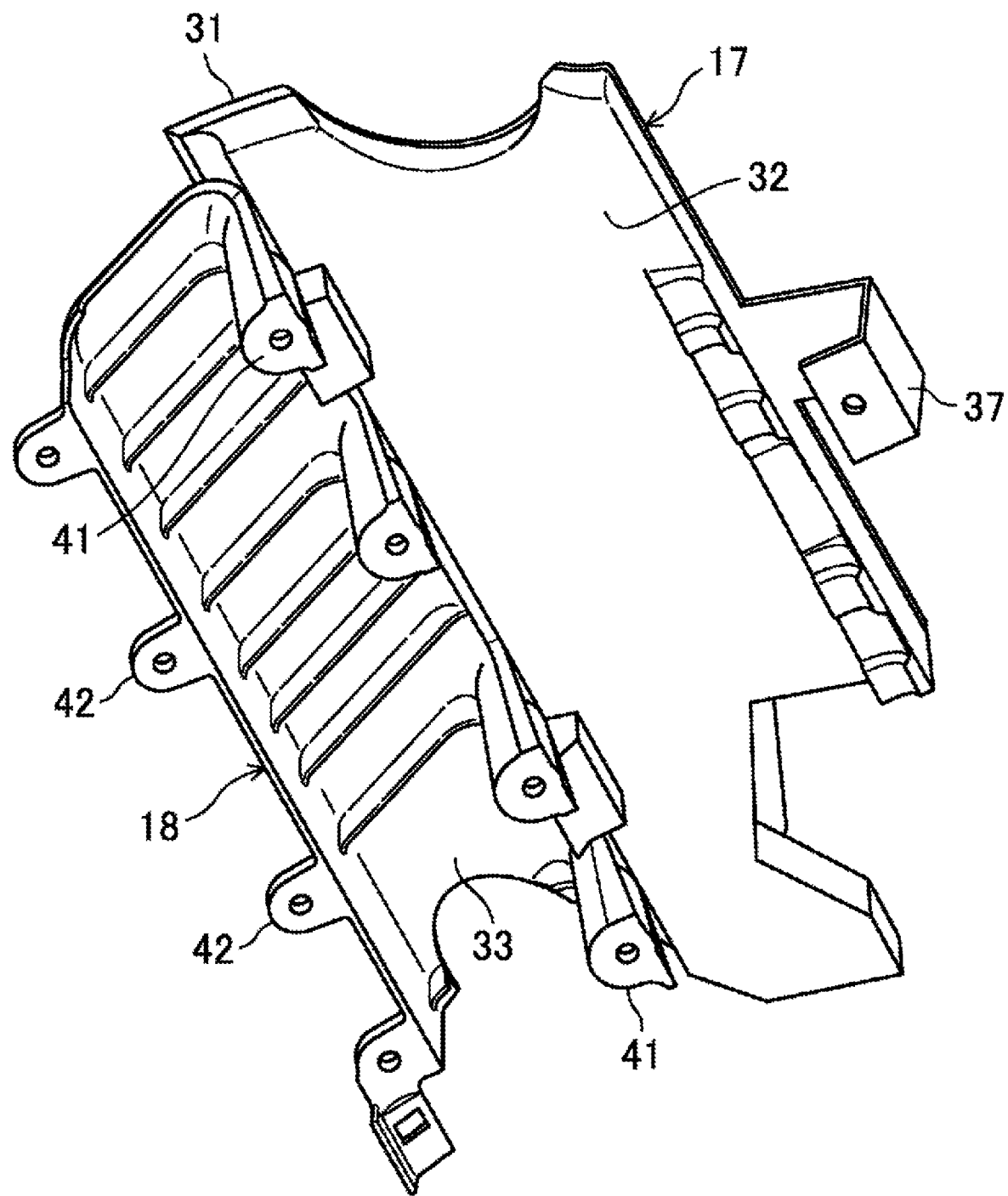
FIG. 9 is a perspective view illustrating this state from below.
Figure 10:
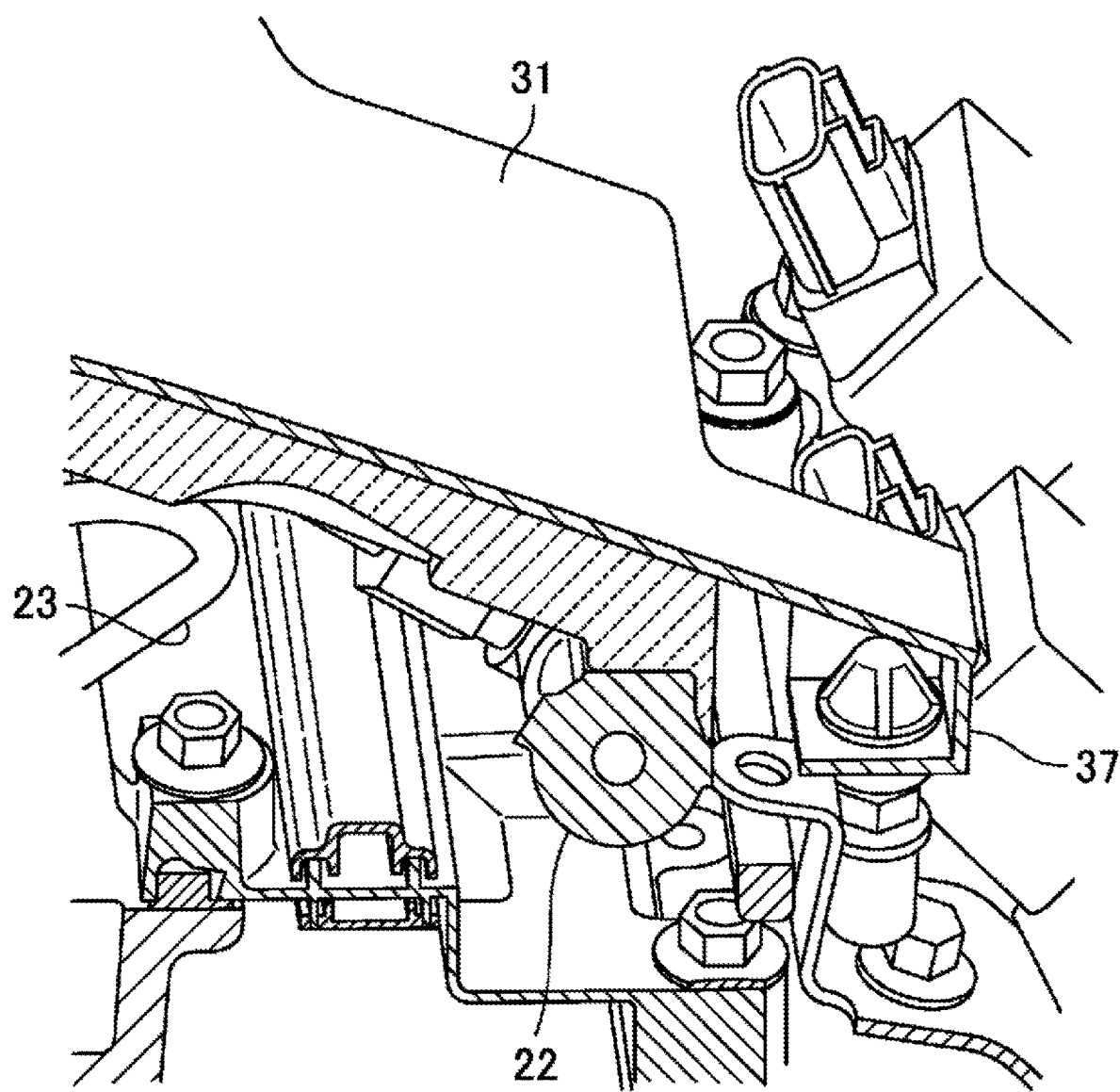
FIG. 10 is a perspective view illustrating a mounting part for mounting the first flow rectifying member to the engine in which a part thereof is illustrated as a cross section.

FIG. 7 to FIG. 9 illustrate the state in which the first flow rectifying member 17 is combined with the plate 33 of the second flow rectifying member 18. The front end of the first flow rectifying member 17 is provided with a hook-shaped mounting part 37 projecting forward. This mounting part 37 is fixed to the engine 1 as illustrated in FIG. 10.

Four legs 41 are provided at intervals in the vehicle width direction at the front end portion of the inclined plate 33 of the second flow rectifying member 18. The legs 41 are fixed to the cylinder head of the engine 1 as illustrated in FIG. 5. At the rear end portion of the plate 33, four mounting parts 42 projecting rearward are provided at intervals in the vehicle width direction. The mounting parts 42 are fixed to the cylinder head of the engine 1 as illustrated in FIG. 4 and FIG. 5. The upper surface of the plate 33 is smooth and the lower surface is provided with concave grooves extending in the vehicle front-rear direction to improve the bending rigidity (bending rigidity about an axis extending in the vehicle width direction).

In the third flow rectifying member 19, as illustrated in FIG. 4, the plate 36 is fixed to the cylinder head of the engine 1 at a mounting part 36a and the insulator 35 is attached to the plate 36.

<Working Effect of Flow Rectifying Members 17 to 19>

While the vehicle travels, a portion of traveling wind that enters the engine bay 3 from the front grille (not illustrated) of the vehicle flows into the traveling wind passage 21 formed between the heat retaining covers 8 and 9 and the flow rectifying members 17 to 19 and then flows rearward to the exhaust manifold 13.

Since traveling wind first flows through the first passage 21a of the traveling wind passage 21 rearward along the smooth upper surface of the first flow rectifying member 17, the traveling wind can be efficiently introduced rearward without being disturbed by fuel system components.

Next, the traveling wind subjected to flow rectification by the first flow rectifying member 17 is subjected to flow rectification so as to be directed to the exhaust manifold 13 by flowing through the second passage 21b of the traveling wind passage 21 along the inclined plane 34a of the second flow rectifying member 18 and the inclined plane 19a of the third flow rectifying member 19.

Next, the traveling wind subjected to flow rectification by the inclined planes 34a and 19a of the second flow rectifying member 18 and the third flow rectifying member 19 flows through the third passage 21c of the traveling wind passage 21 downward toward the exhaust manifold 13.

As described above, the exhaust manifold 13 is efficiently cooled by traveling wind, excessively high temperature exhaust gas can be prevented from flowing into an exhaust gas purification catalyst even when the catalyst is disposed near the exhaust manifold 13, and thermal degradation of the catalyst is advantageously prevented. In addition, since the exhaust manifold 13 can be efficiently cooled by traveling wind as described above, a wide space for introducing traveling wind to the exhaust system component does not need to be provided above the engine 1. Accordingly, unnecessary cooling of the engine 1 can be avoided.

In addition, since a part of the traveling wind flows from the opening 20 between the engine 1 and the front end of the first flow rectifying member 17 into the space between the engine 1 and the first flow rectifying member 17 as cooling air, an abnormal rise in temperature of the fuel system components 22 and 23 can be avoided.

In addition, the insulators 32, 34, and 35 of the first to third flow rectifying members 17 to 19 prevent engine noise from entering the vehicle interior.

The plate 36 of the third flow rectifying member 19 protects the insulator 35 from the heat of the exhaust manifold 13.

Next, when the engine 1 moves rearward due to a frontal collision of the vehicle, the second flow rectifying member 18 collides with the cowl front panel 7 via the rear heat retaining cover 8 prior to the first flow rectifying member 17. That is, an impact load is received by the second flow rectifying member 18. Therefore, it is possible to prevent direct application of a large impact load to the first flow rectifying member 17 and the fuel system components (common rail 22 and fuel pipe 23) provided below the first flow regulation member 17. Accordingly, destruction of the fuel system components due to deformation of the first flow rectifying member 17 and destruction of the fuel system components due to the impact load described above are advantageously prevented.

In addition, since the portion of the cowl front panel 7 that makes contact with the second flow rectifying member 18 is the inclined plane 33a of the plate 33 during the front collision, the cowl front panel 7 slides on the inclined plane 33a and is deformed upward. That is, the force applied from the cowl front panel 7 to the second flow rectifying member 18 is released upward along the inclined plane 33a. Accordingly, the impact received by the second flow rectifying member 18 becomes smaller. Accordingly, the first flow rectifying member 17 and the fuel system components 22 and 23 are advantageously protected by the second flow rectifying member 18.

In addition, when the plate 33 of the second flow rectifying member 18 is deformed due to a collision with the cowl front panel 7 during the front collision, the oil separator 24 below the plate 33 is deformed along with the deformation. Accordingly, an impact is absorbed by the deformation of the oil separator 24 and the first flow rectifying member 17 and the fuel system parts 22 and 23 are thereby more advantageously protected.

It should be noted here that the material of a plate 31 of the first flow rectifying member 17 is not limited to synthetic resin and may be metal such as light alloy or plate steel.

The material of the plate 33 of the second flow rectifying member 18 and the plate 36 of the third flow rectifying member 19 is not limited to light alloy, but may be synthetic resin or plate steel.

OTHER EMBODIMENTS

Figure 11:
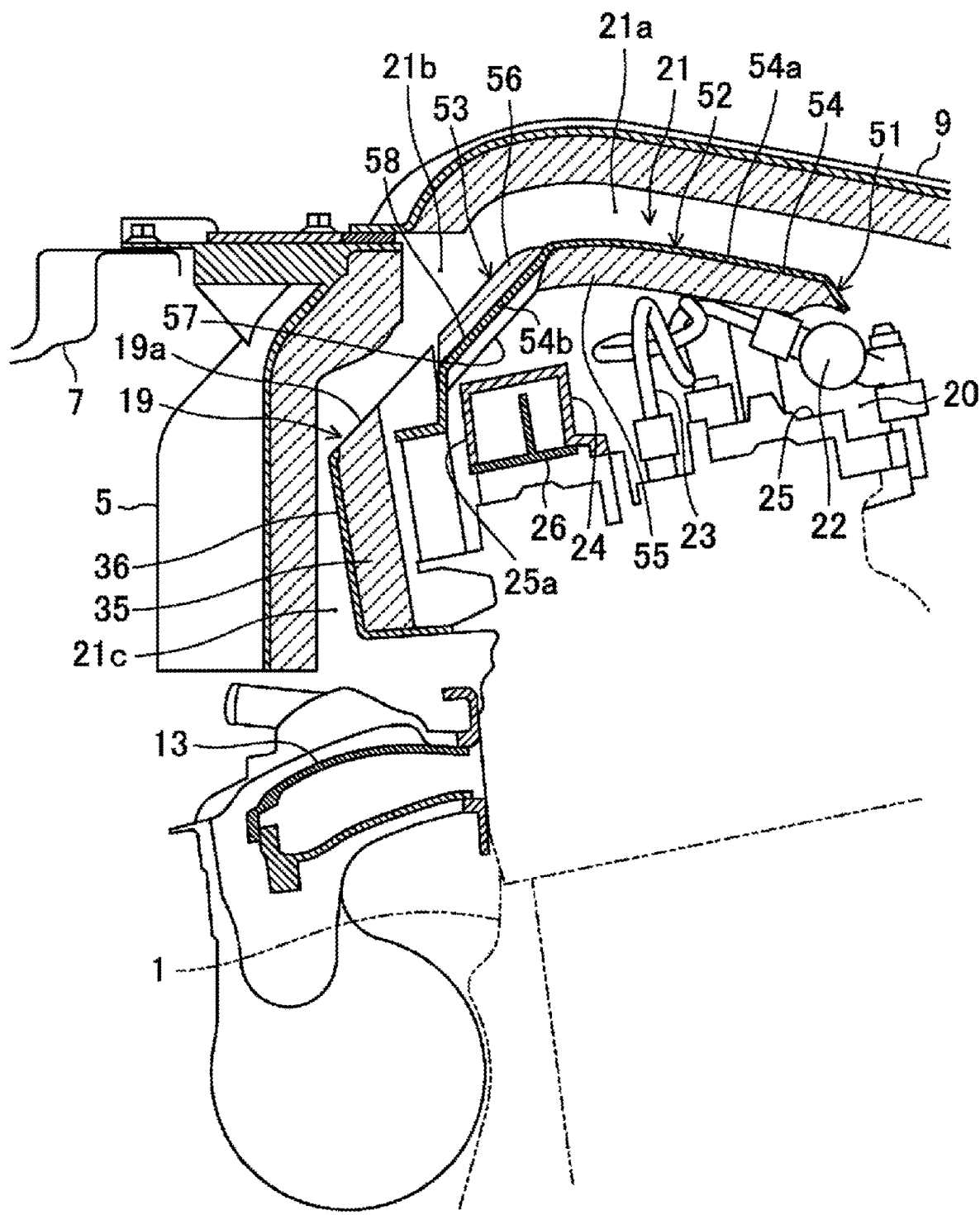
FIG. 11 is a vertical sectional view as FIG. 6 according to another embodiment.

FIG. 11 illustrates a main portion of a structure according to another embodiment. This embodiment is different from the above embodiment having the first flow rectifying member 17 and second flow rectifying member 18 that are separated from each other in that this embodiment is provided with one flow rectifying member 51 having the functions of the flow rectifying members 17 and 18. The other structure of this embodiment is the same as that of the above embodiment.

The flow rectifying member 51 includes a first flow rectifying part 52 that subjects traveling wind to flow rectification so that the traveling wind flows rearward along the upper surface thereof and a second flow rectifying part 53 disposed continuously behind the first flow rectifying part 52. The second flow rectifying part 53 subjects the traveling wind subjected to flow rectification by the first flow rectifying part 52 to flow rectification so that the traveling wind is directed to the exhaust system component (exhaust manifold) along the upper surface thereof and is inclined downward toward the vehicle rear side.

The fuel system components 22 and 23 of the engine 1 are disposed below the first flow rectifying part 52. The oil separator 24 is disposed below the second flow rectifying part 53.

The first flow rectifying part 52 is formed by adhering an insulator 55 made of foamed resin onto the lower surface of a front portion 54a of a plate 54 made of light metal (for example, aluminum alloy). The second flow rectifying part 53 is formed by adhering an insulator 56 made of foamed resin onto the upper surface of a rear portion 54b of the plate 54.

The front portion 54a of the plate 54 extends substantially horizontally in the vehicle front-rear direction and the upper and lower surfaces thereof are smooth. The rear portion 54b of the plate 54 is inclined downward from the rear end of the front portion 54a via a bent portion and a plurality of structure beads 57 extending in the inclination direction are provided at intervals in the vehicle width direction. That is, the rear portion 54b of the plate 54 has a corrugated shape with the plurality of structural beads 57, so the bending rigidity (bending rigidity about an axis extending in the vehicle width direction) is higher than in the front portion 54a of the plate 54. In addition, the inclined upper surface of the insulator 56 of the second flow rectifying part 53 is smooth.

The present embodiment can also obtain the same effect concerning the rectification of traveling wind as the above embodiment.

When the engine 1 is moved rearward due to a front collision of the vehicle and the flow rectifying member 51 collides with the cowl front panel 7, an impact load is received by an inclined plane 58 of the plate rear portion 54b having a high rigidity of the second rectifying portion 53. Therefore, direct application of a large impact load to the first flow rectifying part 52 and the fuel system components 22 and 23 can be avoided. Accordingly, destruction of the fuel system components 22 and 23 due to deformation of the first flow rectifying part 52 or destruction of the fuel system components 22 and 23 due to the impact load described above can be prevented.

In addition, since the rigidity of the second flow rectifying part 53 is high, when the cowl front panel 7 makes contact with the inclined plane of the second flow rectifying part 53, the cowl front panel 7 slides on the inclined plane and is easily deformed upward. That is, the force applied from the cowl front panel 7 to the second flow rectifying part 53 is easily released upward along the inclined plane.

The second flow rectifying part 53 may have a higher rigidity by making the plate thickness thicker than in the first flow rectifying part unit 52.

In addition, the material of the flow rectifying member 51 is not limited to light alloy, but may be plate steel or synthetic resin.

REFERENCE CHARACTERS LIST

1: engine
2: dash panel
3: engine bay
4: vehicle interior
5: cowl panel
6: hood
7: cowl front panel
8, 9: heat retaining cover
13: exhaust manifold (exhaust system component)
17: first flow rectifying member
18: second flow rectifying member
19: third flow rectifying member
20: opening
22: fuel supply common rail (fuel system component)
23: fuel supply pipe (fuel system component)
24: oil separator
33a: inclined plane
34a: inclined plane
51: flow rectifying member
52: first flow rectifying part
53: second flow rectifying part
57: structure bead

The invention claimed is:

1. An upper structure of a rear exhaust engine provided with an exhaust system component behind the engine in a vehicle front-rear direction, the upper structure comprising:
   a first flow rectifying member provided above the engine, the first flow rectifying member subjecting traveling wind to flow rectification so that the traveling wind flows rearward along an upper surface thereof; and
   a second flow rectifying member provided behind the first flow rectifying member, the second flow rectifying member subjecting the traveling wind, subjected to flow rectification by the first flow rectifying member, to flow rectification so that the traveling wind is directed to the exhaust system component along an upper surface thereof,
   wherein a heat retaining cover, which covers the first flow rectifying member and the second flow rectifying member, is provided between the second flow rectifying member and a hood covering the engine so that a traveling wind passage is formed between the heat retaining cover and the first flow rectifying member and between the heat retaining cover and the second flow rectifying member, the traveling wind passage configured to conduct the traveling wind,
   wherein a gap is provided between the heat retaining cover and the hood,
   wherein the heat retaining cover extends toward an exhaust manifold of the exhaust system component so as to direct the traveling wind to the exhaust manifold, and
   wherein a fuel system component of the engine is disposed below the first flow rectifying member.

2. The upper structure of the engine according to claim 1, wherein
   a cowl member extending forward from an upper portion of a dash panel is provided behind the second flow rectifying member,
   the second flow rectifying member has an inclined plane inclined downward toward a rear side to direct the traveling wind to the exhaust system component, and
   the cowl member faces the inclined plane of the second flow rectifying member in the vehicle front-rear direction.

3. The upper structure of the engine according to claim 1, wherein an oil separator having a cavity therein is provided below the second flow rectifying member.

4. The upper structure of the engine according to claim 1, wherein an opening is provided between the engine and a front end of the first flow rectifying member so that the traveling wind flows in a space between the engine and the first flow rectifying member.

5. The upper structure of the engine according to claim 1, wherein the first flow rectifying member and the second flow rectifying member are integrally formed as one flow rectifying member.

6. The upper structure of the engine according to claim 1, wherein the heat retaining cover is an upper heat retaining cover, the upper structure of the engine further comprising:
a back heat retaining cover which covers an upper portion of the engine from a rear side of the engine and is fixed to a front end portion of a cowl front panel, wherein the upper heat retaining cover includes a rear end portion that covers the engine from above and is fixed to and supported by an upper end portion of the back heat retaining cover.

7. The upper structure of the engine according to claim 6, wherein
the first flow rectifying member, the second flow rectifying member, and a third flow rectifying member are arranged in the vehicle front-rear direction; and
the first flow rectifying member, the second flow rectifying member, the third flow rectifying member, the upper heat retaining cover, and the back heat retaining cover form the traveling wind passage that introduces the traveling wind to the exhaust manifold.

8. The upper structure of the engine of claim 6, wherein the traveling wind passage includes a first passage that is substantially horizontal, a second passage continuous with the first passage and that is inclined downward toward a vehicle rear side, and a third passage that is continuous with the second passage and extends downward toward the exhaust manifold.

9. The upper structure of the engine of claim 8, wherein
the upper heat retaining cover is configured to cover the first passage and a portion of the second passage; and
the back heat retaining cover is configured to cover a portion of the second passage and the third passage.

10. An upper structure of a rear exhaust engine provided with an exhaust system component behind the engine in a vehicle front-rear direction, the upper structure comprising:
a flow rectifying member provided above the engine, the flow rectifying member subjecting traveling wind to flow rectification so that the traveling wind is directed to the exhaust system component along an upper surface thereof,
wherein the flow rectifying member includes a first flow rectifying part and a second flow rectifying part provided behind the first flow rectifying part,
wherein a heat retaining cover, which covers the first flow rectifying part and the second flow rectifying part, is provided between the second flow rectifying part and a hood covering the engine so that a traveling wind passage is formed between the heat retaining cover and the first flow rectifying part and between the heat retaining cover and the second flow rectifying part, the traveling wind passage configured to conduct the traveling wind,
wherein a gap is provided between the heat retaining cover and the hood,
wherein the heat retaining cover extends toward an exhaust manifold of the exhaust system component so as to direct the traveling wind to the exhaust manifold,
wherein a fuel system component of the engine is disposed below the first flow rectifying part, and
wherein the second flow rectifying part has a rigidity higher than that of the first flow rectifying part.

11. The upper structure of the engine according to claim 10, wherein
a cowl member extending forward from an upper portion of a dash panel is provided behind the second flow rectifying part,
the second flow rectifying part has an inclined plane inclined downward toward a rear side to direct the traveling wind to the exhaust system component, and
the cowl member faces the inclined plane of the second flow rectifying part in the vehicle front-rear direction.

12. The upper structure of the engine according to claim 10,
wherein an oil separator having a cavity therein is provided below the second flow rectifying part.

13. The upper structure of the engine according to claim 10,
wherein an opening is provided between the engine and a front end of the flow rectifying member so that the traveling wind flows in a space between the engine and the flow rectifying member.

* * * * *